United States Patent Office 2,987,050
Patented June 6, 1961

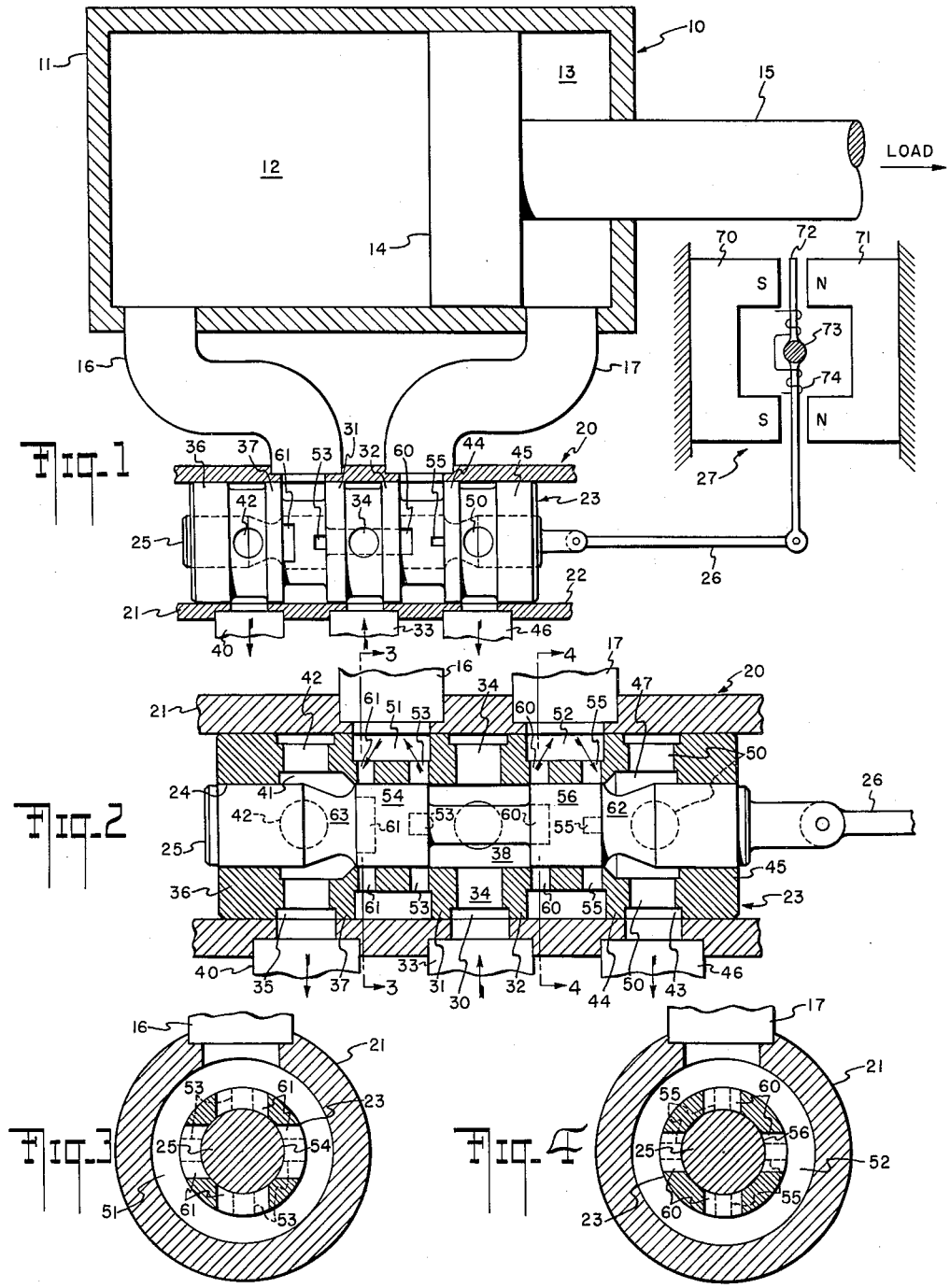

2,987,050
COMPENSATED FLOW CONTROL VALVE
Ernest Oppenheimer, Bethpage, and Frank Seiden, Carle Place, N.Y., assignors to Sperry Rand Corporation, a corporation of Delaware
Filed Apr. 29, 1957, Ser. No. 655,767
3 Claims. (Cl. 121—46.5)

The present invention relates generally to hydraulic control systems and has reference more particularly to improvements in flow control valves for controlling such a system, primarily relating to flow control valves of the multiple orifice type.

Hydraulic control systems generally include a fluid sump or reservoir, a pump for circulating the fluid throughout the various elements of the system and a hydraulic actuator which is actuated by the circulating fluid and may be arranged to be of the reversible type wherein its direction of operation is dependent upon the direction of fluid flow therethrough. Such a system further includes a flow control or servo valve which may be operated by any type of signal responsive means under the control of an operator or automatic signal producing means. The flow control valve controls the rate of flow of fluid and the direction of such flow by the positioning of a member operated by said signal responsive means.

An electro-hydraulic flow control valve converts an electrical signal into a controlled fluid flow and pressure which, in turn, may be subsequently utilized to move a mechanical actuator. Generally the flow control valve consists of two parts, the electromagnetic driver, which converts the electrical signal into a mechanical displacement and the metering portion, which is controlled by the electromagnetic driver and which regulates the output flow. When such a flow control valve is supplied from a constant pressure source, the output flow is usually proportional to the magnitude of the electrical input signal; the direction depending upon the sense of the signal.

The present invention relates to a novel form of the metering portion of a flow control valve of this character. Such valves generally comprise a valve sleeve or cylinder mounted within a housing or body portion having suitable passages and ports connected with the source of pressure fluid, the hydraulic actuator and a sump for receiving exhaust fluid. The valve sleeve has slidably mounted therein a piston-type valve spool having surface areas or lands that cooperate with the ported passages and orifices of the valve sleeve and housing to control the flow of fluid to and from the hydraulic actuator depending upon the position of the valve spool relative to the valve sleeve or housing. The valve spool is exposed to pressure fluid in such a way as to provide static balance when the flow control valve is closed.

In conventional hydraulic flow control valves of the above type, having square edged lands, the flow of fluid through the orifices when the valve is open produces a net force which tends to close the valve, requiring appreciable force to open the valve and seriously impairing the accuracy and sensitivity of the hydraulic control system. This effect has been overcome to some extent by the force compensation method of Shih-Ying Lee as disclosed in his Patent No. 2,747,612 entitled Force-Compensated Flow Valve, issued May 29, 1956, and, as disclosed in his and Mr. Blackburn's article in the September 1952 ASME transactions, entitled "Steady-State Axial Forces on Control-Valve Pistons." However, the aforementioned provides only a partial solution when the hydraulic actuator is connected to a unidirectional load and unsymmetrical flow rates and pressures are encountered through the flow control valve.

The present invention provides a solution to the problem of unsymmetrical flow rates and pressures, particularly where a heavy unidirectional load is connected to the hydraulic actuator, by providing orifice means within the flow control valve including supply and return orifice portions that are compensated with respect to each other for unsymmetrical flow rates, pressure drops and momentum forces to provide a balanced flow control valve and hydraulic control system.

It is, therefore, an object of the present invention to provide an improved flow control valve that is compensated for unsymmetrical flow rates, pressure drops and/or momentum forces.

It is a further object of the present invention to provide an improved flow control valve that is balanced irrespective of fluid flow conditions thereby requiring a minimum of control force to position the valve spool.

It is an additional object of the present invention to provide an improved flow control valve in a hydraulic positioning system wherein the unsymmetrical flow, pressure drop and/or momentum forces are substantially balanced within the control valve.

Another object of the present invention is to provide a fully compensated flow control valve that is extremely accurate and sensitive over a wide range of conditions while being easy and economical to manufacture.

These and other objects of the invention will become apparent from the following description when taken in conjunction with the accompanying drawings wherein like reference numerals indicate like parts throughout the several views of which:

FIG. 1 is a front elevational view partially in section of a hydraulic positioning system including the flow control valve of the present invention;

FIG. 2 is a detailed front elevational view partially in section of the flow control valve of FIG. 1;

FIG. 3 is a cross-sectional view of the flow control valve of FIG. 2 taken along lines 3—3;

FIG. 4 is a view similar to FIG. 3 but taken along lines 4—4.

Referring now to FIGS. 1 and 2 of the drawings, the reversible hydraulic actuator, generally indicated at 10, has a cylinder 11 divided into fluid receiving chambers 12 and 13 by a longitudinally slidable piston 14. A piston rod 15 has one end connected to the piston 14 while the other end thereof extends exteriorly of the cylinder 11 and is operably connected to a load (not shown). Motive liquid is controllably supplied to the respective fluid-receiving chambers 12 and 13 via suitable conduits 16 and 17. The invention will be described, for purposes of example, with respect to a reversible hydraulic actuator 10 having a relatively large unidirectional load connected to the piston rod 15. Further, the relative diameter of the piston rod will be large with respect to the diameter of the piston 14, thereby causing the volumetric rate of flow from and/or to the respective chambers 12 and 13 of the hydraulic actuator 10 to be appreciably asymmetrical for a given movement of piston 14.

The flow of the motive liquid to and from the hydraulic actuator 10 is controlled by the novel flow control valve indicated generally at 20. The flow control valve 20 comprises a housing or body portion 21 having a longitudinal bore 22 therein adapted to receive a valve sleeve 23. The valve sleeve 23 has a longitudinal bore 24 therein adapted to slidably receive a piston-type valve spool 25. A valve rod 26 has one end thereof connected to the valve spool 25 while the other end extends exteriorly of the housing 21 and operably connects to a suitable signal responsive actuating means, such as torque or stroke motor 27, by means of which electrical control signals are converted into mechanical displacement of the valve spool 25 to control the flow of hydraulic fluid through the flow control valve 20. The torque motor 27 is comprised of a permanent magnet (not shown) with oppositely polarized pole pieces 70 and 71 having an armature 72 pivotally mounted by means of torsion bar 73 therebetween. Electrical control windings 74, which may be wound on armature 72, create a magnetic field in response to an electrical control signal which magnetizes armature 72. The strength and direction of the magnetic field is proportional to the magnitude and sense of the control signal and determines the direction and force of attraction of the ends of armature 72 with respect to pole pieces 70 and 71. The motion of armature 72 is opposed by torsion bar 73 which tends to centralize the armature 72 between pole pieces 70 and 71. By connecting one end of the armature 72 to valve rod 26, the amount of flow through the control valve 20 is proportional to the magnitude of the electrical control signal while the direction of flow depends upon the sense of the control signal.

The valve sleeve 23 is provided with an annular groove 30 intermediate the valve sleeve lands 31 and 32 that is connected to the outlet side of a high pressure pump or other suitable pressure fluid source (not shown) via pressure fluid supply conduit 33. Annular groove 30 communicates with passage 38 within valve sleeve bore 24 by means of radial openings 34. The valve sleeve 23 is further provided with annular groove 35 intermediate the valve sleeve lands 36 and 37 that is connected via fluid return conduit 40 to a suitable sump (not shown). Annular groove 35 communicates with passage 41 within the valve sleeve 23 by means of radial openings 42. Similarly, annular groove 43 intermediate valve sleeve lands 44 and 45 is connected by fluid return conduit 46 to said sump and the annular groove 43 communicates with passage 47 by means of radial openings 50.

The valve sleeve 23 is also provided with an annular groove 51 intermediate the valve sleeve lands 37 and 31 that communicates with fluid-receiving chamber 12 of hydraulic actuator 10 via conduit 16. Similarly, annular groove 52 intermediate the valve sleeve lands 32 and 44 communicates with fluid-receiving chamber 13 via conduit 17.

Radially disposed supply orifices 53 within valve sleeve 23 cooperate with valve spool land 54 to controllably supply pressure fluid from supply conduit 33 to chamber 12 while radially disposed return orifices 55 within valve sleeve 23 cooperate with valve spool land 56 to exhaust fluid from chamber 13 to return conduit 46 when the valve spool 25 is moved to the left from the null position shown in the drawings. Similarly, radially disposed supply orifices 60 within valve sleeve 23 cooperate with land 56 to selectively supply pressure fluid from supply conduit 33 to chamber 13 while radially disposed return orifices 61 cooperable with land 54 to exhaust fluid from chamber 12 to return conduit 40 when the valve spool 25 is moved to the right.

The widths, i.e. the axial dimension, of the supply and return orifices 53, 60, 55 and 61 are determined by the maximum stroke or travel of the valve spool 25 and are the same for all the orifices. However, in order to compensate for the unequal flow rates, pressures and momentum forces due to the large unidirectional load and the large piston rod 15, the lengths, i.e., the arcuate circumferential dimension, of the orifices are different as seen more clearly in FIGS. 3 and 4 which will be more fully described later.

To provide a negative-force configuration, as disclosed in the aforementioned ASME article, the return orifices 55 and 61 cooperate with passages 47 and 41 of valve sleeve 23 and reduced sections 62 and 63 of valve spool 25, respectively, in a manner to be described. It will be observed that the supply orifices 53 and 60 cooperate with lands 54 and 56, respectively, to provide a square-edged configuration.

In the operation of the hydraulic control system, the static balance of the valve spool 25 under no-flow conditions is attained in the conventional manner by reason of the exposure of valve spool lands 54 and 56 to the supply pressure fluid. As lands 54 and 56 are of equal diameter and are exposed to equal but oppositely directed fluid pressure, there is no net force tending to move the valve spool 25 in either direction under the influence of the supply pressure fluid in passage 38.

When the valve spool 25 is moved to the left as viewed in the drawings by torque motor 27 in response to an electrical control signal, supply pressure fluid from conduit 33 flows into annular groove 30 through openings 34 and into passage 38. Since land 54 no longer covers supply orifices 53, supply fluid flows through supply orifices 53 into groove 51 and into fluid-receiving chamber 12 of hydraulic actuator 10 via conduit 16. Piston 14 is urged to the right, as viewed in the drawings, by the supply pressure fluid. Simultaneously, fluid from chamber 13 is exhausted via conduit 17 through groove 52. With land 56 no longer closing return orifices 55, the exhaust fluid passes through return orifices 55 into passage 47, through openings 50 into groove 43 and to the sump via conduit 46.

Similarly, when the valve spool 25 is moved to the right as viewed in the drawings by torque motor 27, supply pressure fluid from conduit 33 flows into annular groove 30 through openings 34 and into passage 38. Since land 56 no longer covers supply orifice 60, supply fluid flows through supply orifice 60 into groove 52 and thence into fluid receiving chamber 13 by conduit 17, urging piston 14 to the left. Simultaneously, fluid from chamber 12 is exhausted by conduit 16 through groove 51 thence through return orifices 61 now uncovered by land 54 into passage 41 through openings 42 into groove 35 and to the sump via conduit 40.

It will be observed that the heavy unidirectional load connected to piston rod 15 provides a strong force constantly urging piston 14 to the right, as viewed in the drawings. This force is in a direction to aid the supply pressure fluid when the fluid is supplied to chamber 12 but in a direction to oppose when the pressure fluid is supplied to chamber 13. The heavy unidirectional load, therefore, tends to reduce the fluid pressure in chamber 12 and increase the pressure of the fluid in chamber 13. When valve spool 25 is moved to the left, the relatively high pressure in chamber 13 will cause a large flow of fluid from chamber 13 through conduit 17 and thence through groove 52, return orifices 55, passage 47 and return conduit 46. This flow will cause piston 14 to move rapidly to the right, as viewed in the drawings, tending to evacuate chamber 12 thereby further reducing the already reduced fluid pressure in chamber 12. Unless means are taken to compensate for this condition, the difference in pressures may become appreciable to the extent that cavitation may result. Further, due to the relatively large piston rod 15 extending through chamber 13, there is an appreciable difference in the volume of fluid in chamber 13, as compared with the volume of fluid in chamber 12, when the piston 14 is centralized in the housing 11; the difference in fluid volume obviously being the volume taken up by the piston rod 15. An additional factor to be taken into consideration is the net working area of the left hand side of piston 14, as viewed in the drawing, and the right hand side thereof; the right hand side being less by the area of the piston rod 15, thus requiring greater fluid pressure to move the piston 14 to the left.

Another factor that must be considered is the balancing of the momentum forces that act on the valve spool 25 when it is first opened which are in a direction having a tendency to close the valve spool 25, as explained in the aforementioned Lee Patent No. 2,747,612. With equal flow rates through the supply and return orifices, balancing of the momentum forces on the valve spool 25 can be substantially accomplished in accordance with the teachings of the Lee Patent No. 2,747,612, cited above. However, with the conditions as previously described, the Lee compensation method is unsatisfactory as the momentum forces are unbalanced. In the present invention, the supply orifices 53 and 60 and the return orifices 55 and 61 have been compensated for all the asymmetrical conditions described above to provide a balanced system.

To compensate for all the asymmetrical conditions described above, the supply orifices 53 have a larger area than return orifices 55 thereby providing for the desired and unequal volumetric flow rates considering the greater pressure drop through orifices 55 than orifices 53. The ratio of the areas of orifices 53 to orifices 55 is a compromise between the unequal volumetric rates of flow as required by the unequal areas of the piston 14, the desired pressure drop across the orifices and the balancing of the momentum forces taking into consideration the fact that the heavy unidirectional load is aiding the movement of the piston 14 when the piston 14 is moving to the right as viewed in the drawings. Orifices 60 and 61 are proportionately larger than orifices 53 and 55, respectively, because now the heavy unidirectional load is opposing the movement of piston 14 while the respective ratios of the areas of the orifices remain the same.

A convenient method of designing the orifices 61, 53, 60 and 55 has been found to be the following:

(1) Determine the orifice lengths of orifices 60 related to orifices 61 such that the sum of the momentums created by the flow from orifices 61 and 60 equals zero.

(2) Determine the orifice lengths of orifices 60 relative to the lengths of orifices 61 so that equal or desired pressure drops across the orifices results in the desired flow ratios through the respective orifices.

(3) Compromise the above results always keeping resulting pressures above danger of cavitation.

(4) Now with the orifice lengths of orifices 61 and 60 determined (and thus the area of each set of orifices determined for a given valve spool displacement) determine the flow through orifices 61 for the available pressure drop.

(5) Calculate the area required, i.e., orifice lengths, of orifices 53 to give the same flow through orifices 53 as was determined to exist through orifices 61 but at the pressure drop available through orifices 53.

(6) Calculate the lengths of orifices 53 knowing the stroke of the valve which may, or may not, be equal to the stroke of orifices 61 (depending upon valve design).

(7) Calculate the lengths of orifices 55, using the same compromise relation determined for orifices 61 to 60.

The above compromise method results in providing suitable flow to the chambers 12 and 13 to insure equal rate of movement to the right and to the left of the piston 14 for a predetermined right and left movement of the valve spool 25. Further, it avoids the problem of cavitation and valve chattering due to the heavy unidirectional load on the hydraulic actuator 10. With the valve spool 25 designed to provide means for balancing momentum forces under equal flow conditions as disclosed in Patent No. 2,747,612, the appropriate design of the orifices of the present invention will provide substantial compensation for the momentum forces under the outlined conditions by compromising the velocity of the fluid through each pair of supply and return orifices.

Although for purposes of simplicity of illustration only one hydraulic actuator 10 is shown connected to and controlled by a single flow control valve 20, in an actual embodiment of the present invention, four such hydraulic actuators 10 were connected to and controlled by a single flow control valve 20 for simultaneous actuation thereby. In the aforementioned actual embodiment, the following conditions prevailed to influence the selection of the proper dimensions of the supply and return orifices 53, 60, 55 and 61 to provide satisfactory operation of the system. Each piston 14 had a diameter of 4½ inches and an overall stroke of 5½ inches at a desired travel rate of .4 inch per second. Each piston rod 15 had a diameter of 1¾ inches and each piston rod 15 was connected to a unidirectional substantially constant load of approximately 30,000 pounds each. Pressure fluid was supplied to the single control valve 20 via supply conduit 33 at approximately 2700 p.s.i. pressure and exhausted via return conduits 40 and 46 at approximately 60 p.s.i. pressure. The diameter of the lands 54 and 56 of valve spool 25 was about .438 inch. The stroke of the valve spool 25 was approximately .018 inch where the stroke is the distance in either direction from the null position. The effective widths of the supply and return orifices 53, 60, 55 and 61 were approximately .018 inch. The effective arcuate length as circumferentially determined by bore 24 of each of the four supply orifices 53 that was found to be satisfactory was approximately .099 inch while the arcuate length of each of the four supply orifices 60 was about .264 inch. The arcuate length of each of the four return orifices 55 that was found to be satisfactory was approximately .070 inch while the arcuate length of each of the four return orifices 61 was about .346 inch.

The width of the orifices depends upon the effective stroke of the valve spool. Therefore, as shown, orifices 61 are separated from orifices 53 while orifices 60 are separated from orifices 55. However, this is entirely a matter of design, since any suitable configuration is acceptable between the orifices that will simplify machining the parts. Thus, for example, orifices 61 and 53 may be connected to form T-shaped openings or may be in the form of two orifices 61 and 53 with a circular aperture therebetween. Although the invention has been described with respect to rectangular shaped orifices, it is not intended that the invention be restricted thereto as the final consideration of the orifice configuration, for any given valve spool position, is determined by the exposed area of the effective orifice regardless of the particular shape of the partially covered orifice.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. In combination, a hydraulic actuator having a cylinder housing with a piston slidable therein forming first and second fluid-receiving chambers, a piston rod having one end connected to said piston and the other end extending through said first chamber exteriorly from said cylinder housing to connect to a unidirectional load, a flow control valve adapted to selectively control the flow of fluid to said first and second chambers in accordance with a control signal, a signal responsive motive means, said valve having a moving part movable in response to said signal by said signal responsive motive means, said flow control valve including first and second asymmetrical orifice means connected to said first and second chambers for controlling the flow of pressure fluid to and from said first and second chambers, respectively, in accordance with the movement of said moving part, each of said first and second orifice means having asymmetrical supply and return portions wherein the supply portion of said first orifice means is compensated for flow rate, pressure drop and momentum forces to match the return portion of said second orifice means and the supply portion of said second orifice means is similarly compensated to match the return portion of said first orifice means whereby the unidirectional load is movable at an equal rate in either direction for a control signal having a given magnitude with the direction of movement depending upon the sense of the signal, the supply portion of said first orifice means associated with said first chamber through which said pressure fluid flows to oppose said unidirectional load having an area less than the area of the return portion of said second orifice means associated with said second chamber, the supply portion of said second orifice means associated with said second chamber through which said pressure fluid flows to aid said unidirectional load having an area greater than the area of the return portion of said first orifice means associated with said first chamber, the supply portion of said first orifice means having an area greater than the area of the supply portion of said second orifice means, the return portion of said first orifice having an area less than the area of the return portion of said second orifice means.

2. In combination with a hydraulic actuator having a cylinder housing with a piston slidable therein to form first and second fluid-receiving chambers, a piston rod having one end connected to said piston and the other end extending through said first chamber exteriorly from said cylinder housing and connected to a unidirectional load, a flow control valve adapted to selectively control the flow of fluid to said first and second chambers in accordance with a control signal, said flow control valve including first and second asymmetrical pairs of orifices for controlling the flow of fluid to and from said first and second chambers, respectively, each of said first and second pairs of orifices having at least one supply and one return orifice with the supply orifice of said first pair compensated for flow rate, pressure drop and momentum forces to match the return orifice of said second pair and the supply orifice of said second pair similarly compensated to match the return orifice of said first pair, said flow control valve further including a valve spool having first and second land portions cooperable with said first and second pairs of orifices, respectively, for regulating the flow of fluid in accordance with said control signal, the supply orifice of said first pair of orifices associated with said first chamber through which said pressure fluid flows to oppose said unidirectional load having an area less than the area of the return orifice of said second pair of orifices associated with said second chamber, the supply orifice of said second pair of orifices associated with said second chamber through which said pressure fluid flows to aid said unidirectional load having an area greater than the area of the return orifice of said first pair of orifices associated with said first chamber, the supply orifice of said first pair of orifices having an area greater than the area of the supply orifice of said second pair of orifices, the return orifice of said first pair of orifices having an area less than the area of the return orifice of said second pair of orifices.

3. In a system for selectively controlling the flow of fluid to and from first and second fluid-receiving chambers of a hydraulic actuator movable thereby in accordance with a control signal, said hydraulic actuator having a substantially constant unidirectional load applied thereto, a control valve comprising a housing having a sleeve therein, said sleeve having a bore adapted to receive a valve spool slidably fitted therewithin, said housing having an inlet passage adapted to be connected to a source of fluid under pressure and a pair of outlet passages adapted to be connected to exhaust fluid openings connecting said passages with said bore, compensated asymmetrical supply and return orifices symmetrically disposed in said valve sleeve, said valve spool having land portions cooperating with said supply orifices for selectively controlling the flow of fluid from said inlet passage to said first and second chambers and cooperating with said return orifices for selectively controlling the flow of fluid from said first and second chambers to said outlet passages, and a motor means responsive to said control signal and operably coupled to said valve spool for positioning said valve spool lands with respect to said orifices, said orifices being compensated for asymmetrical flow rates, pressure drops and momentum forces to provide movement of the load at an equal rate in either direction for a control signal having a given magnitude with the direction of movement depending upon the sense of the signal, the supply orifice associated with said first chamber through which said pressure fluid flows to oppose said unidirectional load having an area less than the area of the return orifice associated with said second chamber, the supply orifice associated with said second chamber through which said pressure fluid flows to aid said unidirectional load having an area greater than the area of the return orifice associated with said first chamber, the supply orifice associated with said first chamber having an area greater than the supply orifice associated with said second chamber, the return orifice associated with said first chamber having an area less than the area of the return orifice associated with said second chamber.

References Cited in the file of this patent
UNITED STATES PATENTS

| | | |
|---|---|---|
| 2,055,530 | Hallenbeck | Sept. 29, 1936 |
| 2,071,677 | Wood | Feb. 23, 1937 |
| 2,396,643 | De Ganahl et al. | Mar. 19, 1946 |
| 2,608,263 | Garrison | Aug. 26, 1952 |
| 2,612,872 | Strayer | Oct. 7, 1952 |
| 2,631,571 | Parker | Mar. 17, 1953 |
| 2,648,313 | Clifton | Aug. 11, 1953 |
| 2,708,909 | Curlett | May 24, 1955 |
| 2,751,752 | Metcalf | June 26, 1956 |
| 2,765,378 | Perry et al. | Oct. 2, 1956 |
| 2,822,783 | Clifton et al. | Feb. 11, 1958 |